United States Patent
Liebelt et al.

(10) Patent No.: US 9,229,670 B1
(45) Date of Patent: Jan. 5, 2016

(54) FLEXIBLE ATTRIBUTE TRACKING AND REPORT GENERATION FOR A WORKFLOW

(71) Applicants: Linda Sue Liebelt, Boulder, CO (US); Robert Patrick Smyth, Thornton, CO (US); Marquis G. Waller, Beverly, OH (US); Scott Thomas Ziegler, Boulder, CO (US)

(72) Inventors: Linda Sue Liebelt, Boulder, CO (US); Robert Patrick Smyth, Thornton, CO (US); Marquis G. Waller, Beverly, OH (US); Scott Thomas Ziegler, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/322,045

(22) Filed: Jul. 2, 2014

(51) Int. Cl.
*G06F 3/12* (2006.01)

(52) U.S. Cl.
CPC ............ *G06F 3/1273* (2013.01); *G06F 3/1203* (2013.01); *G06F 3/1237* (2013.01); *G06F 3/1296* (2013.01)

(58) Field of Classification Search
CPC ... G06F 3/1273; G06F 3/1203; G06F 3/1296; G06F 3/1237
USPC ........................................................ 358/1.15
See application file for complete search history.

(56) References Cited

U.S. PATENT DOCUMENTS

| | | | |
|---|---|---|---|
| 6,977,744 B2 | 12/2005 | Taranath et al. | |
| 7,661,142 B2 | 2/2010 | Daos et al. | |
| 8,395,796 B2 | 3/2013 | Imamichi | |
| 2005/0018242 A1 | 1/2005 | Azami | |
| 2007/0103715 A1* | 5/2007 | Nakata | G06F 3/1203 358/1.14 |
| 2008/0180733 A1* | 7/2008 | Imamichi | G06K 15/00 358/1.15 |
| 2009/0097066 A1* | 4/2009 | Fukudome | H04N 1/00856 358/1.15 |
| 2010/0195138 A1* | 8/2010 | DeRoller | G06F 3/1203 358/1.15 |
| 2011/0058213 A1* | 3/2011 | Waller | G06F 3/1207 358/1.15 |
| 2011/0179379 A1 | 7/2011 | Allen et al. | |
| 2011/0194135 A1 | 8/2011 | Hamilton et al. | |

* cited by examiner

*Primary Examiner* — Benjamin O Dulaney
(74) *Attorney, Agent, or Firm* — Duft Bornsen & Fettig LLP (57) ABSTRACT

System and methods for flexible attribute tracking and report generation for a workflow. One embodiment is a workflow server that receives a selection of attributes to track for print jobs as the print jobs are processed in a print system, and generates print reports based on the attributes being tracked. The workflow server receives an indication to remove a first attribute from tracking, receives an instruction to include data for the first attribute in a print report, retrieves the data for the first attribute that was recorded before removal of the first attribute from tracking, and includes the data for the first attribute in the print report while the first attribute remains removed from tracking.

12 Claims, 7 Drawing Sheets

PRINT REPORT GENERATION

SELECT CUSTOMER NO.: 4589

CURRENTLY TRACKED ATTRIBUTES:
- 410 — JOB ID [X]
- 411 — DATE [X]
- 412 — ADDRESS LINE 3 [X]
- 413 — ADDRESS LINE 2 [X]
- 414 — ADDRESS LINE 1 [X]

PREVIOUSLY TRACKED ATTRIBUTES:
- 501 — # OF STATEMENTS [X]
- 502 — CHECK NUMBERS [X]
- 503 — CHECK PAYEE [ ]
- 504 — DOCUMENT ID [ ]

505 — ENTER TIME PERIOD: JAN 1, 2012 TO DEC 31, 2012

506 — GENERATE PRINT REPORT

CANCEL

FIG. 6

PRINT REPORT

CUSTOMER NO.: 4589

| JOB ID (410) | DATE (411) | ADDRESS (412-414) | # OF STATEMENTS IN 2012 (501) | CHECK # (502) |
|---|---|---|---|---|
| 004589-001 | 2 YEARS AGO | 5489 CIRCLE DURHAM, NC 27701 | 324 | 10052578 |
| ⋮ | | | | |
| 004589-530 | LAST YEAR | 8143 LILAC ATLANTA, GA 30327 | N/A | N/A |
| ⋮ | | | | |
| 004589-850 | TODAY | 221 BROADWAY SAN JOSE, CA 95101 | N/A | N/A |

FIG. 7

FLEXIBLE ATTRIBUTE TRACKING AND REPORT GENERATION FOR A WORKFLOW

FIELD OF THE INVENTION

The invention relates to the field of document processing systems, and in particular, to tracking attributes of documents processed in a print shop.

BACKGROUND

Many businesses have a need to track and report data relating to their services, either for internal reports, industry-specific regulations, or other accounting needs. Tracking software records large volumes of data pertaining to documents that are processed within an organization's workflow, such as which documents were printed for a customer, what information is included in the documents, and to which address the documents were sent. A print report may then summarize the collected data.

Current tracking software is limited in options for customizing the attributes which are tracked and reported. Most organizations simply track as many attributes as allowed in the tracking software. However, this method of data collection requires an inordinate amount of storage space and over-complicates report generation for the user.

SUMMARY

Embodiments described herein provide for flexible attribute tracking and report generation in a document processing system. A list of attributes may be presented to a user, such as a bank, credit card company, etc., and the user selects from the list attributes that they would like to track for their workflow. If or when the user's business needs change the user may update the selection of attributes by either adding additional attributes to be tracked and/or removing certain attributes from tracking in the workflow. Previously recorded values for tracked attributes may be included in a print report regardless as to whether that attribute is currently being tracked. In previous systems, data for an attribute may only be included in a print report if the attribute is also currently being tracked.

One embodiment is a workflow server configured to receive a selection of attributes to track for print jobs being processed in a print system, and to generate print reports based on the attributes being tracked. The workflow server is also configured to receive an indication to remove a first attribute from tracking, to receive an instruction to include the first attribute in a print report, to retrieve data for the first attribute that was recorded before removal of the first attribute from tracking, and to include the data for the first attribute in the print report while the first attribute remains removed from tracking.

Another embodiment is a method for flexible attribute tracking and report generation in a workflow. The method includes receiving a selection of attributes to track for print jobs being processed in a print system, and generating print reports based on the attributes being tracked. The method also includes receiving an indication to remove a first attribute from tracking, receiving an instruction to include data for the first attribute in a print report, retrieving the data for the first attribute that was recorded before removal of the first attribute from tracking, and including the data for the first attribute in the print report while the first attribute remains removed from tracking.

The above summary provides a basic understanding of same aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
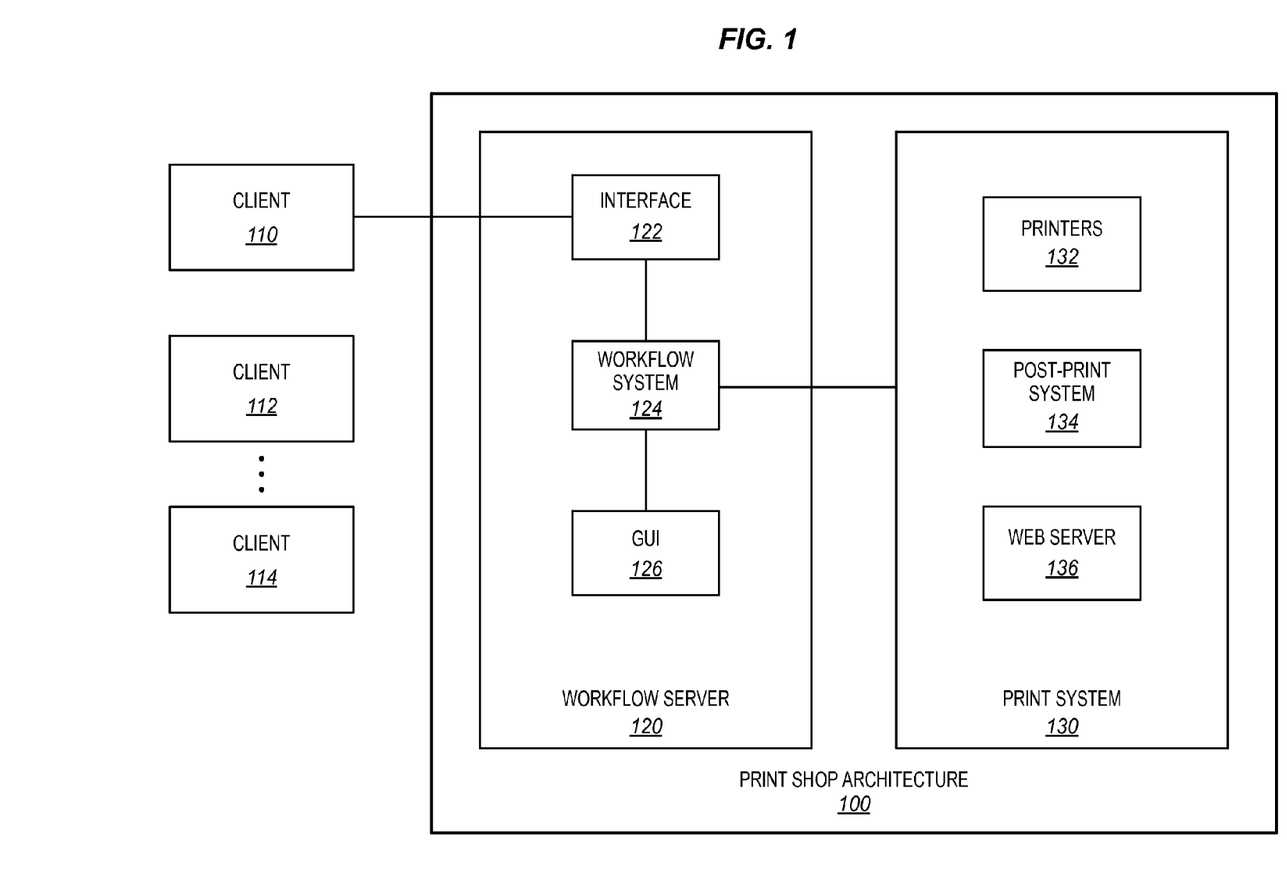
FIG. 1 is a block diagram of a print shop architecture 100 in an exemplary embodiment.

FIG. 1 is a block diagram illustrating a print shop architecture 100 in an exemplary embodiment. The print shop architecture 100 includes a workflow server 120 and a print system 130. The workflow server 120 communicates with clients 110-114 via interface 122 to obtain print data. Clients 110-114 may be servers or software applications used by print shop customers to submit print jobs. The workflow server 120 processes the received print jobs and directs operations of the print system 130 with a workflow system 124. In this embodiment, the print system 130 includes one or more printers 132 for transforming print data onto a suitable printable medium, a post-print system 134 for performing various post-print operations, such as cutting, stapling, folding, inserting, mailing, shipping, etc., and a web server 136 for generating emails, web content, etc. In order to aid an operator of the print shop in creating a print workflow for a print job, a Graphical User Interface (GUI) 126 is provided for manipulation of print workflows.

Figure 2:
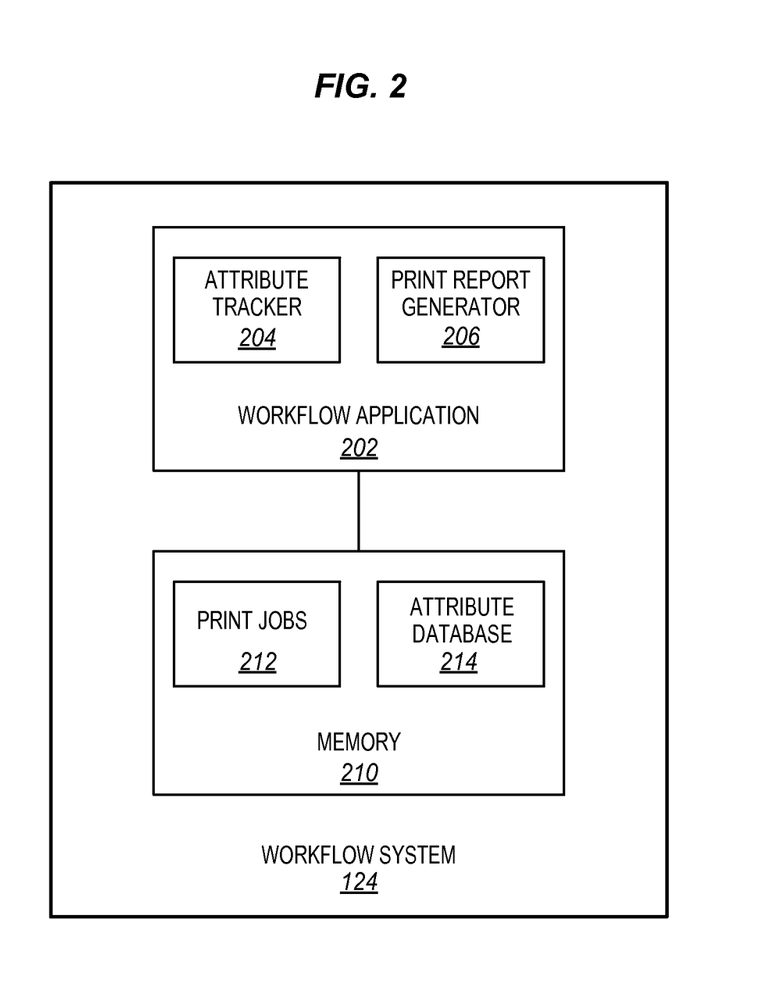
FIG. 2 is a block diagram of a workflow system in an exemplary embodiment.

FIG. 2 is a block diagram illustrating the workflow system 124 in an exemplary embodiment. The workflow system 124 is configured to generate a print workflow based on information in job tickets of print jobs 212 and on the available resources of the print system 130. A workflow application 202 directs the devices of the print system 130 to perform the activities defined by the workflow for a given print job. The workflow application 202 is enhanced with an attribute tracker 204 configured to record values of print job attributes in a customizable manner. For instance, a user of client system 110 may indicate a list of attributes to track for their workflow and add/remove selected attributes from tracking as their business needs change. Attributes may include an indication of print job progress (e.g., job status, completion time, etc.) and/or any characteristic of the print job itself such as the destination address, job type, customer number, check number, etc. A value of an attribute refers to the content of an attribute of a print job that is processed in the print system 130 (e.g., "Check.Num 1234", "Mailed Aug. 24th", etc.).

The workflow system 124 includes memory 210 to store print jobs 212 received from clients 110-114. Also included in memory 210 is an attribute database 214 that stores the values of the customized list of attributes tracked/recorded for each user or client 110-114. The workflow application 202 is further enhanced with a print report generator 206 that generates custom print reports for each user or client 110-114. More particularly, the print report generator 206 may generate print reports for a particular user using any combination of attribute values stored in the attribute database 214 whether or not those attributes are at that time being tracked by the attribute tracker 204. In previous tracking software solutions, a print report is based solely on attributes actively being tracked and thus a user must "re-add" an attribute to current tracking if any old or previously recorded data for that attribute is desired in a print report.

Figure 3:
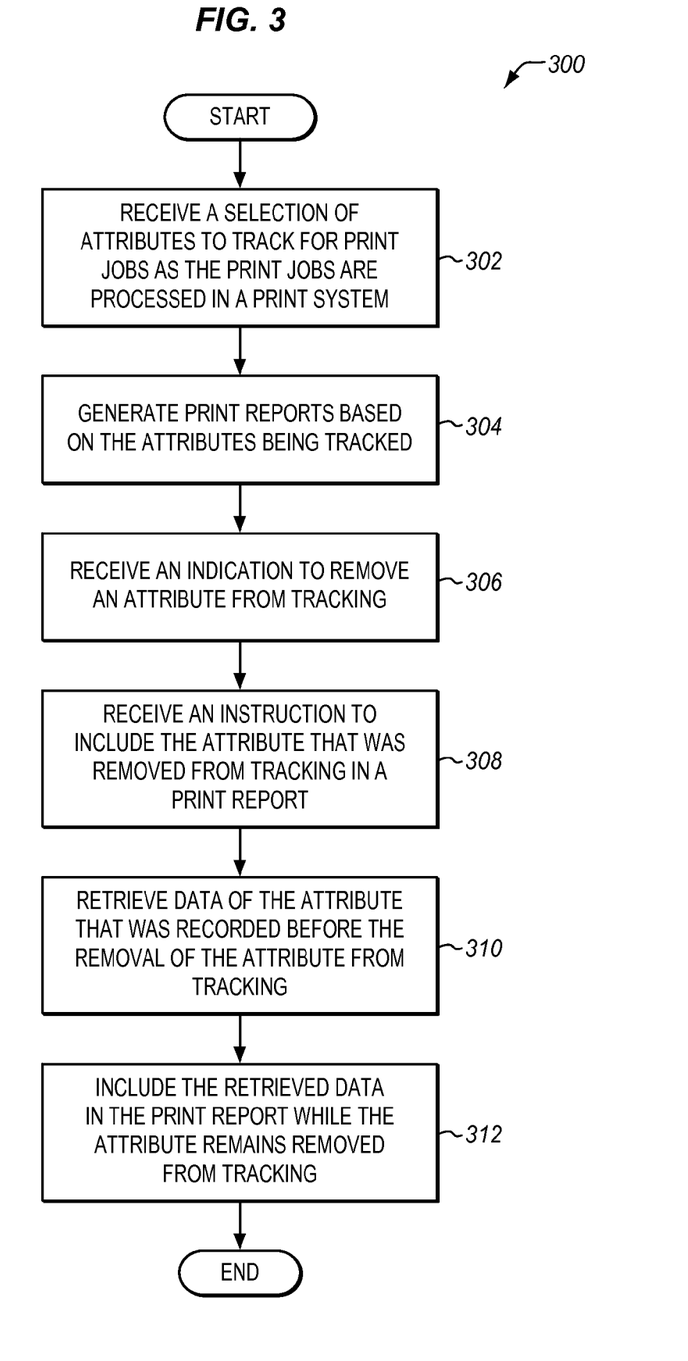
FIG. 3 is a flowchart illustrating a method for operating a print shop architecture in an exemplary embodiment.

FIG. 3 is a flow chart illustrating a method 300 for operating a workflow system 124 in an exemplary embodiment. The steps of the method 300 will be described with respect to the print shop architecture 100 of FIG. 1 and the workflow system 124 of FIG. 2, although one skilled in the art will understand that method 300 may be performed by other systems not shown. The steps of the method 300 described herein are not all inclusive and may include other steps not shown. The steps for the flow charts shown herein may also be performed in an alternative order.

At step 302, the attribute tracker 204 receives a selection of attributes to track for print jobs as the print jobs are processed in print system 130. In one embodiment, the workflow system 124 presents/receives a list of attributes over the interface 122 using a server-side web interface and/or client-side tools operated by the customer.

At step 304, the print report generator 206 generates print reports based on the attributes being tracked. The print reports present the recorded data values or a summary of recorded data values for attributes that are currently being tracked for a user. The print reports may be submitted to a user/client in response to a request and/or at a specified time or interval (e.g., every three months, end of fiscal year, etc.).

At step 306, the attribute tracker 204 receives an indication to remove an attribute from tracking. For example, a user/client may remove an attribute from the list of selected attributes for current tracking/recording via a remove button of a graphical user interface to send the attribute back to the list of available attributes. In one embodiment, historical data of the removed attribute is maintained in the attribute database 214, but subsequent print jobs submitted by the user do not have values for the removed attribute tracked or recorded.

At step 308, the print report generator 206 receives an instruction to include the attribute that was removed from tracking in a print report. It may be desirable to include, for example, certain historical data for previously tracked attributes in a print report such as the number of statements printed for a client in a previous fiscal year even though attributes for that client are no longer tracked. The instruction to include a removed attribute in a print report may be received from a user of clients 110-114 or an operator of the workflow server 120.

At step 310, the print report generator 206 retrieves data of the attribute that was recorded before the removal of the attribute from tracking. In one embodiment, the print report generator 206 accesses the attribute database 214 and populates a print report using the historical values that were recorded and stored in the attribute database 214 when the attribute was previously being tracked.

At step 312, the print report generator 206 includes the retrieved data in the print report while the attribute remains removed from tracking. In other words, the print report generator 206 may generate a print report that includes historical values of an attribute removed from tracking without re-adding the removed attribute back to the list of currently tracked attributes. In one embodiment, a user may select to generate a custom print report that includes a combination of attribute values currently being tracked and attribute values previously tracked. This allows a user to build any number of reports without storing unneeded data. Moreover, as a customer's business changes, the workflow system 124 tracks and records the values that the user has deemed important without overwhelming storage and report generation.

In one embodiment, a user may add an attribute to tracking and the attribute tracker 204 begins recording values of that attribute for new print jobs submitted to the workflow system 124 without perturbing existing data in the attribute database 214. Data for the newly added attributes may be included in print reports subject to user-specification, such as including the data for the newly added attributes alongside data of attributes added to tracking before the newly added attributes and/or alongside data for attributes removed from tracking. In one embodiment, the attribute database 214 comprises a flexible set of Structured Query Language (SQL) commands that append data values for tracked attributes to SQL tables. This allows the print report generator 206 to generate a customized print report that includes attributes recorded at different times to be included in the same print report upon client request.

EXAMPLES

Figure 4:
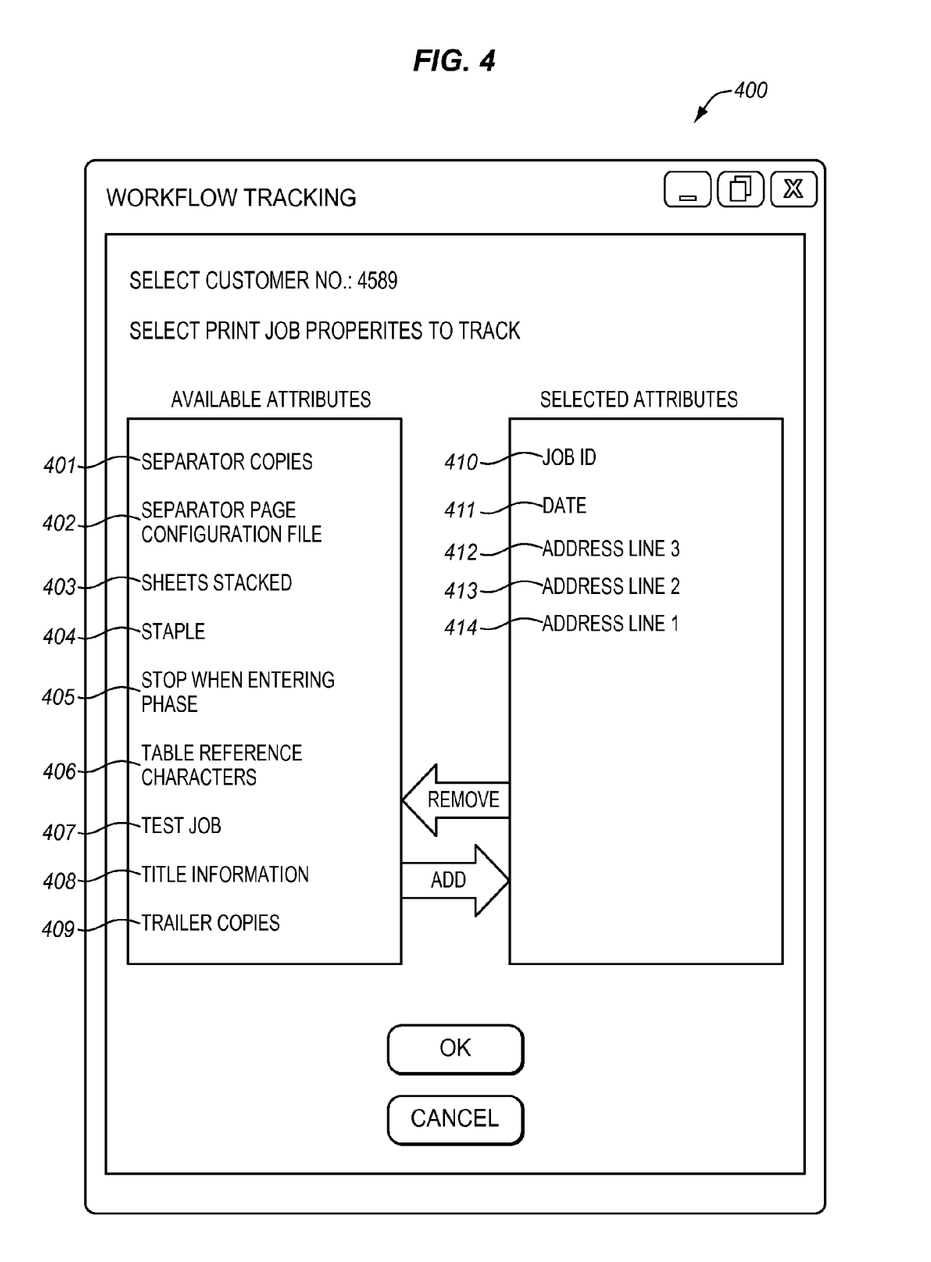
FIG. 4 is illustrates a Graphical User Interface (GUI) for user attribute selection in an exemplary embodiment.

FIG. 4 illustrates of a Graphical User Interface (GUI) 400 for user attribute selection in an exemplary embodiment. The workflow system 124 may determine the type of devices and components of the print shop architecture 100 that are used to perform print shop activities and submits a scrollable list of available attributes (e.g., attributes 401-409) to track based on resources of the print shop. Print shop resources may exist within the confines of the print shop itself, or may comprise off-site devices and functional components managed by workflow server 120. As shown in the example of FIG. 4, the user has selected to track/record values of attributes 410-414 for current/subsequent print jobs processed in the print system 130 for a selected customer/user (e.g., customer number 4589), though tracked attributes may be continuously adjusted via the add/remove buttons of the GUI 400.

Figure 5:
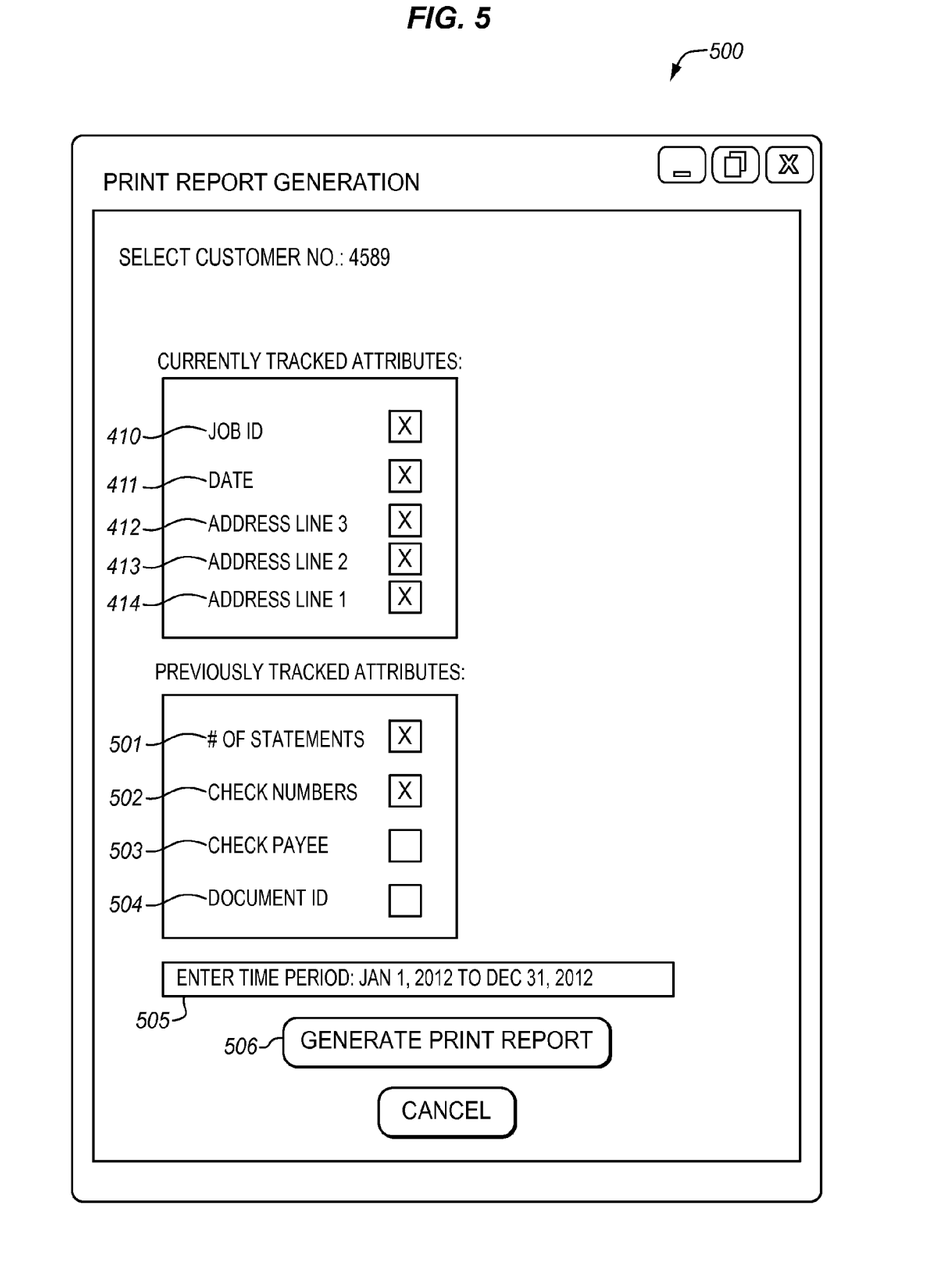
FIG. 5 illustrates a GUI for print report generation in an exemplary embodiment.

FIG. 5 illustrates a GUI 500 for print report generation in an exemplary embodiment. This interface presents a list of currently tracked attributes (e.g., attributes 410-414) for a selected customer (e.g., customer number 4589). The interface also presents a list of attributes that have been tracked for that customer at a previous point in time (e.g., (attributes 501-504.) Next to each attribute, a checkbox may be selected that indicates whether that attribute is to be included in a print report. In this example, user has selected each of the currently tracked attributes 410-414 and has additionally selected attributes 501 and 502 which were tracked for the selected customer previously but have since been removed from tracking. For each attribute or group of attributes a user may select/enter a period of time for when values of that attribute or group of attributes were recorded (e.g., element 505). With the desired attributes selected, user may generate a print report via element 506.

Figure 6:
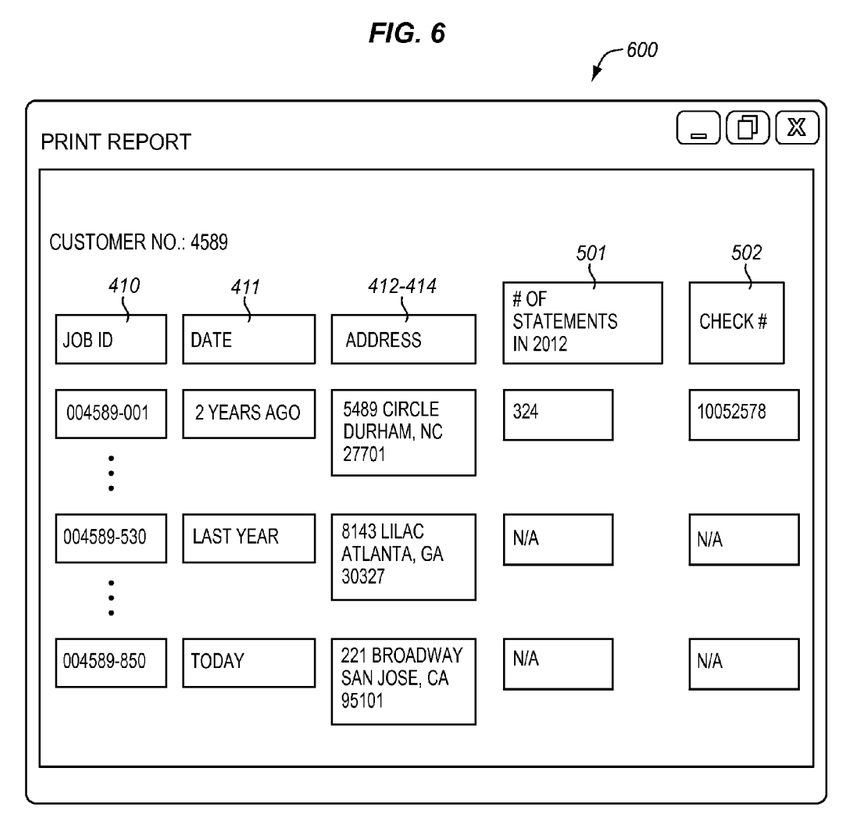
FIG. 6 illustrates a print report in an exemplary embodiment.

FIG. 6 illustrates a print report 600 in an exemplary embodiment. The print report 600 includes data values for currently tracked attributes 410, 411, and 412-414. In this example, currently tracked attributes 410, 411, and 412-414 have been tracked for at least two years. However, some attributes were removed after the 2012 calendar year, such as the number of statements 501 and check numbers 502. For reporting purposes, the user is able to include removed attributes 501 and 502 alongside or instead of those attributes which are currently tracked (e.g., attributes 410-414) without re-tracking the removed attributes. In other words, old data for the removed attributes 501 and 502 may be included in print report 600 even though new print jobs do not record values for those attributes.

Figure 7:
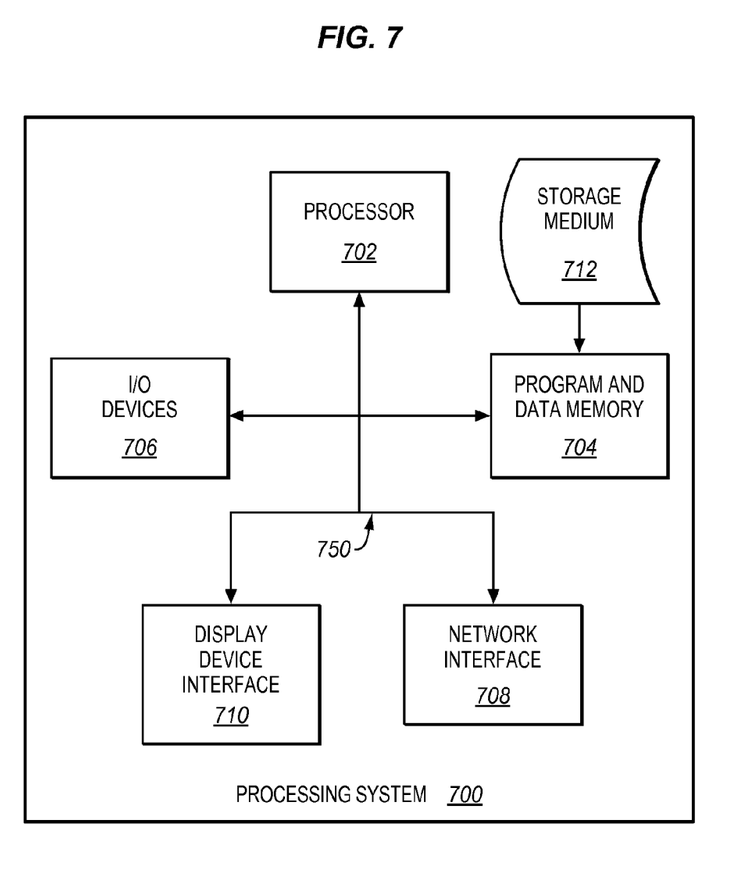
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of the print server 120 to perform the various operations disclosed herein. FIG. 7 illustrates a processing system 700 configured to execute a computer readable medium embodying programmed instructions to perform desired functions in an exemplary embodiment. Processing system 700 is configured to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702.

Although specific embodiments were described herein, the scope of the inventive concept(s) is not limited to those specific embodiments. The scope of the inventive concept(s) is defined by the following claims and any equivalents thereof.

We claim:
1. An apparatus comprising:
a workflow server configured to receive a selection of attributes to track as print jobs are being processed in a print system, and to generate print reports based on the attributes that currently belong to the selection;
the workflow server configured to receive an indication to remove an attribute from the selection, and, in response to the indication, to stop recording values for the removed attribute as print jobs are processed in the print system;
the workflow server configured to receive an instruction to include data for the removed attribute in a print report, and in response, to generate the print report based on the attributes that currently belong to the selection and values of the removed attribute that were recorded prior to the removal from the selection, wherein the attribute remains removed from the selection during generation of the print report.

2. The apparatus of claim 1 wherein:
the selection of attributes to track are specific to print jobs received from a particular user.

3. The apparatus of claim 1 wherein:
the workflow server is configured to add another attribute to the selection of attributes to track, and to generate print reports that include newly recorded values of the other attribute.

4. The apparatus of claim 1 wherein:
the workflow server is configured to receive the selection of attributes to track via a graphical user interface (GUI).

5. A method comprising:
receiving a selection of attributes to track as print jobs are processed in a print system;
generating print reports based on the attributes that currently belong to the selection;
receiving an indication to remove an attribute from the selection;
responsive to the indication, stopping recording values for the removed attribute as print job are processed in the print system;
receiving an instruction to include data for the removed attribute in a print report, and in response:
generating the print report based on the attributes that currently belong to the selection and values of the removed attribute that were recorded prior to the removal from the selection;
wherein the attribute remains removed from the selection during generation of the print report.

6. The method of claim 5 wherein:
the selection of attributes to track are specific to print jobs received from a particular user.

7. The method of claim 5 comprising:
adding another attribute to the selection of attributes to track; and
generating print reports that include newly recorded values of the other attribute.

8. The method of claim 5 comprising:
receiving the selection of attributes to track via a graphical user interface (GUI).

9. A non-transitory computer readable medium embodying programmed instructions which, when executed by a processor, are operable to perform a method comprising:
receiving a selection of attributes to track as print jobs are processed in a print system;
generating print reports based on the attributes that currently belong to the selection;
receiving an indication to remove an attribute from the selection;
responsive to the indication, stopping recording values for the removed attribute as print job are processed in the print system;
receiving an instruction to include data for the removed attribute in a print report, and in response:
generating the print report based on the attributes that currently belong to the selection and values of the removed attribute that were recorded prior to the removal from the selection;
wherein the attribute remains removed from the selection during generation of the print report.

10. The medium of claim 9 wherein:
the selection of attributes to track are specific to print jobs received from a particular user.

11. The medium of claim 9 the method comprising:
adding another attribute to the selection of attributes to track; and
generating print reports that include newly recorded values of the other attribute.

12. The medium of claim 9 the method comprising:
receiving the selection of attributes to track via a graphical user interface (GUI).

* * * * *